UNITED STATES PATENT OFFICE.

ARNOLD H. PETER, OF HASTINGS-UPON-HUDSON, NEW YORK.

CLEANSING AND DISINFECTING FLUID.

981,876. Specification of Letters Patent. Patented Jan. 17, 1911.

No Drawing. Continuation of application Serial No. 472,287, filed January 14, 1909. This application filed October 12, 1909. Serial No. 522,277.

*To all whom it may concern:*

Be it known that I, ARNOLD H. PETER, a citizen of Switzerland, residing at Hastings-upon-Hudson, in the county of Westchester and State of New York, have invented certain new and useful Improvements in Cleansing and Disinfecting Fluids, of which the following is a specification.

This invention relates to the preparation of cleansing and disinfecting fluids which contain as their essential components alkali-hypobromite and alkali, the latter in proper proportion to impart stability and cleansing power to the solution.

Cleansing and disinfecting fluids are used in the brewing industry, in the manufacture of preserves, in the industry of milk-products, etc., for the purpose of cleansing and sterilizing the apparatus and utensils of these industries. I have found that a solution containing alkali-hypobromite and alkali fulfils the requirements of a cleansing and disinfecting fluid for the purposes mentioned to an exceptional degree.

It is well known that alkali-hypobromites exhibit great activity in their chemical reactions, especially toward organic compounds; such solutions were therefore to be expected, theoretically, to possess disinfecting power. The reason why alkali-hypobromite had not been used as a disinfecting agent, and especially not as a cleansing and disinfecting fluid for the purposes above mentioned, is that the alkali-hypobromite, in a pure state, is well known to be highly unstable; therefore cleansing and disinfecting fluids consisting essentially of hypobromite solutions would lose their efficiency in a short time. It has been observed however that alkali-hypobromite becomes relatively stable in presence of suitable proportions of free alkali, and I investigated by experiment whether by the addition of alkali to an alkali-hypobromite solution it would be possible to produce a disinfecting fluid which would preserve its efficiency long enough for practical purposes. This was found to be the case, and furthermore the addition of alkali to an alkali-hypobromite solution was found to produce another highly important technical result. Alkali-hypobromite solutions, when brought into contact with organic substances, spend their chemical energy so freely that the solutions possess little penetrating power. Cleansing and disinfecting fluids must however possess a high degree of penetrating and dissolving power in addition to their disinfecting power, in order that they may remove organic substances or deposits of a refractory nature, as later explained in connection with the so-called "beer stone". I have found that the addition of alkali in proper proportions to an alkali-hypobromite solution regulates the action of alkali-hypobromite upon organic substances, greatly increases the penetrating power of the fluid and renders the disinfecting power of the alkali-hypobromite far more valuable and available.

As an illustration of the use of the cleansing and disinfecting fluids mentioned, and as showing the purposes which they are required to serve, the following example may be cited: In the pipes used in breweries for conveying the beer there is formed a deposit which is technically known as "beer stone", this designation sufficiently characterizing its nature. The simplest and cheapest way of removing this beer stone would be to dissolve it. Alkali solutions dissolve the beer stone only partially, and the resulting solutions are of disagreeable nature, of obnoxious odor, and carry with them a grave danger of infection. By using solutions containing alkali and alkali-hypobromite, the result is entirely different. The beer stone is easily and completely soluble in such solutions, and the resulting solutions are practically odorless and are sterile.

The solutions of alkali and alkali-hypobromite as prepared for use for cleansing and disinfecting purposes in accordance with this invention are characterized by a pleasant odor, recalling that of ozone. Many of the disinfecting fluids heretofore employed are obnoxious by reason of their odor, as for example solutions containing alkali-hypochlorite. In instances where it is imperative that the odor of the disinfecting and cleansing fluid should be of a pleasant nature as in the production of food products, etc., the solutions herein described are without rival.

I have found that a solution which contains an alkali and an alkali hypobromite in proper proportions to insure stability possesses remarkable efficiency both in sterilizing and cleansing beer vats and the like, and possesses also in contradistinction to all other agents known to me and particularly in contradistinction to the hypochlorites, the advantage that it does not communicate to the beer or other product any characteristic or disagreeable taste or odor. While the hypochlorites and hypobromites are in some respects quite closely related from a purely chemical viewpoint, I have found as the result of careful tests on a technical scale that in respect to their capacity for communicating to beer or food products a disagreeable flavor they are utterly dissimilar.

The amount of alkali present in the solutions of alkali and alkali-hypobromite should be sufficient to insure stability of the alkali-hypobromite, but must also respond to another condition: that is, it must impart pronounced cleansing properties to the fluid. I have found that the amount of alkali present in these solutions of alkali and alkali-hypobromite to render them effective as cleansing fluids is for most applications of the solution higher than the amount of alkali necessary to insure the stability of the alkali-hypobromite. The alkali therefore is added in sufficient proportion to serve the double purpose of rendering the alkali-hypobromite stable and imparting to the solutions efficiency as cleansing fluilds. On the other hand, the addition of alkali in excessive amounts should be avoided, as I have found, in direct opposition to the heretofore accepted view, that the effect of the addition of an excessive proportion of alkali to a hypobromite solution is to diminish its stability as compared with solutions containing a lesser proportion of alkali. In general, the free alkali should not exceed fifteen per cent. by weight of the solution, and the active bromin should not exceed three per cent. by weight thereof. The following example discloses the cheapest and most practicable method now known to me for preparing the above-mentioned stable solutions. It is to be distinctly understood however that the invention is not restricted to the particular method described.

Into a solution of ten parts of caustic soda in ninety parts of water, kept at a low temperature as for instance 5° C., are introduced two to four parts by weight of bromin, and the mixture is agitated until solution has taken place. The resulting liquid is yellow in color, this color being however less pronounced in case the liquid has not been kept at a low temperature during the solution of the bromin, for the reason that in such case a larger amount of sodium bromate is formed, which is not desirable. The excess of sodium hydrate insures rapid solution of the bromin, and renders the sodium hypobromite stable. The solution will generally be diluted before or during use, and the above-mentioned proportions of alkali will be found to impart both stability and cleansing power to the diluted as well as to the undiluted solution.

It should be understood that the invention is not limited to the specific proportions mentioned in the example; but the amount of alkali should in all cases be such as to insure the stability of the alkali-hypobromite, that is to say, to insure the solution against serious loss of its active bromin content for a period of one to several weeks under the conditions, as regards exposure to light, variations of temperature, etc., to which it is subjected in the course of technical use or during transportation.

This application is a continuation of my earlier application Serial No. 472,287, filed January 14, 1909.

I claim:—

1. A cleansing and disinfecting fluid containing alkali and alkali-hypobromite, the free alkali not in excess of fifteen per cent. by weight of the liquid and the active bromin not in excess of three per cent. by weight thereof.

2. A cleansing and disinfecting fluid containing caustic soda and sodium hypobromite, the free caustic soda not in excess of fifteen per cent. by weight of the liquid and the active bromin not in excess of three per cent. by weight thereof.

In testimony whereof, I affix my signature in presence of two witnesses.

ARNOLD H. PETER.

Witnesses:
 JOHN R. LANG,
 L. JACOBS.